(12) United States Patent
Andrew et al.

(10) Patent No.: US 10,832,873 B2
(45) Date of Patent: Nov. 10, 2020

(54) POLYMERIC CAPACITORS FOR ENERGY STORAGE DEVICES, METHOD OF MANUFACTURE THEREOF AND ARTICLES COMPRISING THE SAME

(71) Applicant: THE UNIVERSITY OF MASSACHUSETTS, Boston, MA (US)

(72) Inventors: Trisha L. Andrew, Amherst, MA (US); Lushuai Zhang, Sunderland, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 4 days.

(21) Appl. No.: 15/926,081

(22) Filed: Mar. 20, 2018

(65) Prior Publication Data

US 2018/0269006 A1    Sep. 20, 2018

Related U.S. Application Data

(60) Provisional application No. 62/473,615, filed on Mar. 20, 2017.

(51) Int. Cl.
  *H01G 11/48*    (2013.01)
  *H01G 9/028*    (2006.01)
  (Continued)

(52) U.S. Cl.
  CPC .......... *H01G 11/48* (2013.01); *H01G 9/0029* (2013.01); *H01G 9/028* (2013.01); *H01G 9/07* (2013.01);
  (Continued)

(58) Field of Classification Search
  CPC ........ H01G 11/48; H01G 11/56; H01G 11/02; H01G 11/52; H01G 11/84; H01G 9/028; H01G 9/0029
  See application file for complete search history.

(56) References Cited

U.S. PATENT DOCUMENTS 7,618,680 B2    11/2009  Gleason et al.
8,147,962 B2 *   4/2012  Hsu .......................... C08L 65/00
                                                       257/40
(Continued)

FOREIGN PATENT DOCUMENTS

WO    WO-2016103282 A1 *  6/2016  ............. D21H 17/46

OTHER PUBLICATIONS

Lock et al., Oxidative Chemical Vapor Deposition of Electrically Conducting Poly(3,4-ethylenedioxythiophene) Films, Jul. 14, 2006, Macromolecules, vol. 39, pp. 5326-5329 (Year: 2006).*
(Continued)

*Primary Examiner* — Nathan Milakovich
(74) *Attorney, Agent, or Firm* — Cantor Colburn LLP

(57) ABSTRACT

Disclosed herein is an electrically insulating substrate comprising a p-doped poly(3,4-ethylenedioxythiophene) layer disposed thereon, where the p-doped poly(3,4-ethylenedioxythiophene) layer is manufactured by a method comprising charging a vapor comprising 3,4-ethylenedioxythiophene into a reactor; where the reactor comprises the electrically insulating substrate; charging a vapor comprising an iron salt into the reactor; polymerizing the 3,4-ethylenedioxythiophene with the iron salt to form the p-doped poly(3,4-ethylenedioxythiophene); and disposing the poly(3,4-ethylenedioxythiophene) layer on the substrate.

19 Claims, 13 Drawing Sheets

(51) Int. Cl.
| | |
|---|---|
| H01G 9/07 | (2006.01) |
| H01G 11/84 | (2013.01) |
| H01G 11/52 | (2013.01) |
| H01G 11/02 | (2013.01) |
| H01G 11/56 | (2013.01) |
| H01G 9/00 | (2006.01) |

(52) U.S. Cl.
CPC ............ *H01G 11/02* (2013.01); *H01G 11/52* (2013.01); *H01G 11/56* (2013.01); *H01G 11/84* (2013.01); *Y02E 60/13* (2013.01)

(56) References Cited

U.S. PATENT DOCUMENTS

| | | | | |
|---|---|---|---|---|
| 8,617,736 | B2* | 12/2013 | Bhatt | H01G 9/042 |
| | | | | 429/127 |
| 9,214,639 | B2 | 12/2015 | Gleason et al. | |
| 10,109,427 | B2* | 10/2018 | Ishikawa | C08L 65/00 |
| 2013/0199822 | A1 | 8/2013 | Fan et al. | |
| 2015/0027529 | A1* | 1/2015 | Barr | H01L 51/442 |
| | | | | 136/256 |
| 2016/0055983 | A1* | 2/2016 | Kurungot | H01G 11/28 |
| | | | | 361/502 |
| 2017/0213657 | A1* | 7/2017 | Kaner | H01G 11/26 |
| 2017/0288158 | A1* | 10/2017 | Pillow | H01L 51/424 |
| 2018/0237993 | A1* | 8/2018 | Kurungot | D21H 27/00 |
| 2020/0020489 | A1* | 1/2020 | Liu | H01G 11/48 |

OTHER PUBLICATIONS

Im et al., Systematic Control of the Electrical Conductivity of Poly(3,4-ethylenedioxythiophene) via Oxidative Chemical Vapor Deposition, 2007, Macromolecules, vol. 40, pp. 6552-6556 (Year: 2007).*

Im et al., Doping Level and Work Function Control in Oxidative Chemical Vapor Deposited Poly(3,4-ethylenedioxythiophene), Apr. 12, 2007, Applied Physics Letters, vol. 90, pp. 152112-1 to 152112-3 (Year: 2007).*

Im, Sung Gap, Oxidative and Initiated CVD for Application to Organic Electronics, 2009, Massachusetts Institute of Technology (Year: 2009).*

Acerce et al.; "Metallic 1T phase MoS2 nanosheets as supercapacitor electrode materials"; Nature Nanotechnology; vol. 10; Apr. 2015; pp. 313-318.

Atta et al.; "Analytical Applications of Organic Conducting Polymer Electrodes"; Tr. J. of Chemistry; vol. 21; 1997; pp. 21-29.

Bhattacharyya et al.; "Vapor Phase Oxidative Synthesis of Conjugated Polymers and Applications"; Journal of Polymer Science Part B: Polymer Physics; vol. 50; 2012; pp. 1329-1351.

Choi et al.; "Stretchable, Weavable Coiled Carbon Nanotube/MnO2/Polymer Fiber Solid-State Supercapacitors"; Scientific Reports; vol. 5, No. 9387; 2015; pp. 1-6.

Jost et al.; "Natural Fiber Welded Electrode Yarns for Knittable Textile Supercapacitors"; Advanced Energy Materials; 2014; 8 pages.

Jost et al.; "Textile energy storage in perspective"; Journals of Materials Chemistry A; vol. 2; 2014; pp. 10776-10787.

Patra et al.; "Bimetallic and Plasmonic Ag—Au on Tio2 for Solar Water Splitting: An Active Nanocomposite for Entire Visible-Light-Region Absorption"; ChemCatChem; vol. 8; 2016; pp. 3294-3301.

Zhao et al.; "PEDOT-based composites as electrode materials for supercapacitors"; Nanotachnology; vol. 27; 2016; 19 pages.

* cited by examiner

POLYMERIC CAPACITORS FOR ENERGY STORAGE DEVICES, METHOD OF MANUFACTURE THEREOF AND ARTICLES COMPRISING THE SAME

CROSS REFERENCE TO RELATED APPLICATIONS

This application is a Non-Provisional application which claims the benefit of U.S. Provisional Application No. 62/473,615, filed Mar. 20, 2017, which is incorporated by reference in its entirety herein.

BACKGROUND

This disclosure relates to polymeric capacitors for energy storage devices, methods of manufacture thereof and to articles comprising the same.

Supercapacitors are a type of two-electrode electrochemical energy storage system that are different from batteries and that can be fully charged or discharged in a very short period of time leading to a much higher power delivery or uptake over shorter times (over seconds) compared to a battery. Supercapacitors often complement batteries as energy storage systems. Supercapacitors are used, for example, for back-up power supplies to prevent power disruption and load-levelling, and to provide short bursts of power for electric cars (during acceleration) or airplane emergency exit doors, whereas batteries are used to deliver stable, higher energy densities over longer periods of time.

There are three known types of supercapacitors, characterized by the charge storage mechanism and active materials used to construct the final device. The first type is an electrochemical double layer capacitor, which stores charge electrostatically using reversible adsorption of electrolyte ions onto active materials that are electrochemically stable and have high, accessible specific surface area. Each of the two electrodes for an electrochemical double layer capacitor comprise a layer of porous, high surface-area carbon-based active materials deposited on a thin metal sheet. The supercapacitor device is constructed by sandwiching an ionic electrolyte between these two electrodes.

The second type include pseudo-capacitors or redox supercapacitors, which use fast and reversible surface or near-surface redox reactions for charge storage. Electrodes for pseudo-capacitors comprise an active layer of transition metal oxides or conducting organic polymers deposited on a thin metal sheet. The final pseudocapacitor device can be constructed by placing an ionic electrolyte between two electrodes containing either the same active layer material or electrodes containing different active layer materials.

The third type is a hybrid supercapacitor, which combines a redox-active electrode with a capacitor-like electrode in the same cell. Currently, two different approaches to hybrid supercapacitors are use. These are (a) one pseudo-capacitive transition metal oxide electrode plus one capacitive porous carbon electrode, and (b) one lithium-insertion electrode with one capacitive carbon electrode. The final hybrid supercapacitor device is constructed by sandwiching an ionic electrolyte between these two different electrodes.

In all aforementioned types of supercapacitors, a common component is a thin metal sheet that serves as both a substrate and a current collector for the final super-capacitive device. It is desirable to manufacture supercapacitor devices that do not use the conductive metal current collector.

SUMMARY

Disclosed herein is an electrically insulating substrate comprising a p-doped poly(3,4-ethylenedioxythiophene) layer disposed thereon, where the p-doped poly(3,4-ethylenedioxythiophene) layer is manufactured by a method comprising charging a vapor comprising 3,4-ethylenedioxythiophene into a reactor; where the reactor comprises the electrically insulating substrate; charging a vapor comprising an iron salt into the reactor; polymerizing the 3,4-ethylenedioxythiophene with the iron salt to form the p-doped poly(3,4-ethylenedioxythiophene); and disposing the poly(3,4-ethylenedioxythiophene) layer on the substrate.

Disclosed herein is an article comprising a first electrically insulating substrate upon which is disposed a first p-doped poly(3,4-ethylenedioxythiophene) layer to form a first coated substrate; a second electrically insulating substrate upon which is disposed a second p-doped poly(3,4-ethylenedioxythiophene) layer to form a second coated substrate; and an electrically insulating layer disposed between the first coated substrate and the second coated substrate; where the electrically insulating layer prevents electrical communication between the first electrically insulating substrate and the second electrically insulating substrate.

Disclosed herein too is a method comprising charging a vapor comprising 3,4-ethylenedioxythiophene into a reactor; where the reactor comprises an electrically insulating substrate; charging a vapor comprising an iron salt into the reactor; polymerizing the 3,4-ethylenedioxythiophene with the iron salt to form a p-doped poly(3,4-ethylenedioxythiophene); and disposing a p-doped poly(3,4-ethylenedioxythiophene) layer on the electrically insulating substrate.

BRIEF DESCRIPTION OF THE FIGURES

FIG. 6 is a Ragon plot of PEDOT hybrid supercapacitors on plastic made with symmetric PEDOT-PEDOT electrodes;

DETAILED DESCRIPTION

Figure 1:
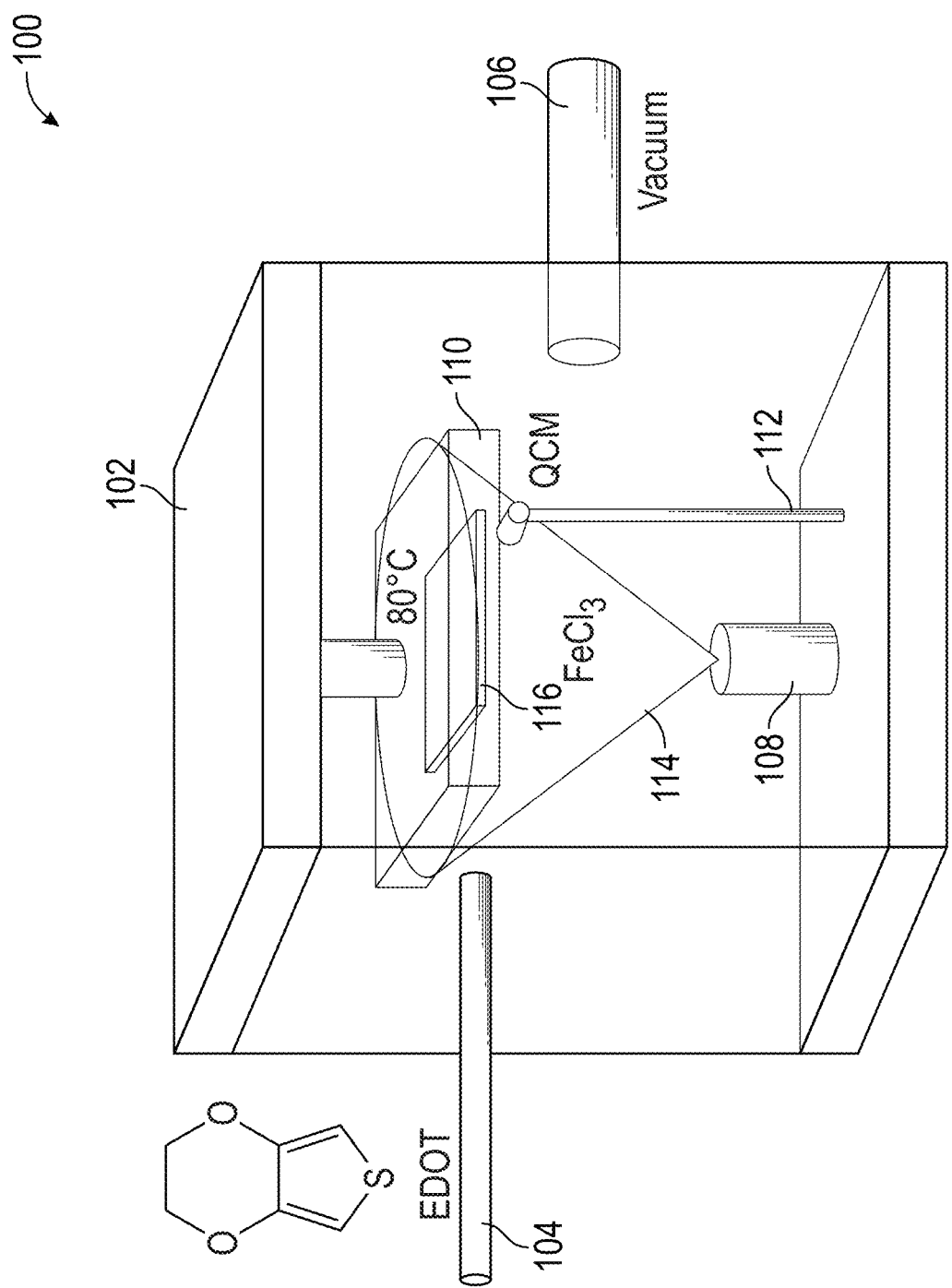
FIG. 1 depicts an exemplary reactor for manufacturing the poly(3,4-ethylenedioxythiophene) film that has supercapacitive properties.

Disclosed herein is a method of manufacturing a supercapacitor that comprises highly p-doped films of poly(3,4-ethylenedioxythiophene) (p-doped PEDOT). The p-dopant may be any trivalent iron salt (i.e., iron (iii) salt). In an embodiment, the method comprises polymerizing 3,4-ethylenedioxythiophene (EDOT) in the presence of a vapor of an iron-salt. The iron-containing salt is an oxidant that facilitates the polymerization of the 3,4-ethylenedioxythiophene, which is disposed on a substrate in a reactor. The polymerization reaction is a vapor phase reaction—i.e., it is conducted in the vapor phase.

A supercapacitor (SC) (also called an electric double-layer capacitor (EDLC), also called supercap, ultracapacitor or Goldcap) is a high-capacity capacitor with capacitance values much higher than other capacitors (but lower voltage limits) that bridge the gap between electrolytic capacitors and rechargeable batteries. They store 10 to 100 times more energy per unit volume or mass than electrolytic capacitors, can accept and deliver charge much faster than batteries, and tolerate many more charge and discharge cycles than rechargeable batteries. The supercapacitors disclosed herein have a power density of about 10 to $10^6$ Watts per kilogram and an energy density of 0.04 to 12 watt hours per kilogram.

The poly(3,4-ethylenedioxythiophene) film formed from vapor phase polymerization using an iron salt is advantageous because it displays an ideal capacitive behavior when disposed on a non-electrically conducting substrate (i.e., electrically insulating backing). A "backing" is the material that the poly(3,4-ethylenedioxythiophene) film is in contact with and is typically insulating. The contact includes direct contact. This ideal capacitive behavior is displayed when the backing is not a metal current collector, a porous carbon material or a transition metal oxide redox material, which are typically used with comparative poly(3,4-ethylenedioxythiophene) films that display such ideal capacitive behavior. In other words, the ideal capacitive behavior is displayed when the backing is not electrically conducting.

In this disclosure, the dopant is uniformly distributed through the p-doped PEDOT film. In an embodiment, the poly(3,4-ethylenedioxythiophene) is uniformly doped having a dopant concentration of $10^{10}$ atoms per $cm^3$ to $10^{20}$ atoms per $cm^3$ and a concentration variation of $\pm 10^3$ atoms per $cm^3$.

The 3,4-ethylenedioxythiophene has the structure of formula (1):

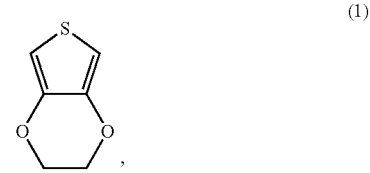

which upon polymerization has the structure of formula (2):

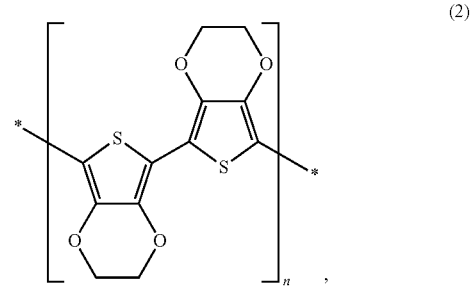

where "n" is the number of repeat units.

In an embodiment, n (the number of repeat units) may be greater than 20, preferably greater than 30, and more preferably greater than 40. In an embodiment, n is 20 to 10,000, preferably 50 to 9000, and more preferably 100 to 8500.

The iron salt may be any salt that can be vaporized (either by boiling or sublimation) at the reaction temperature. The iron salts may be divalent iron salts, trivalent iron salts, or a combination thereof. It is generally desirable for the iron salts to be trivalent iron salts. Examples of salts are iron (III) chloride, iron (III) bromide, iron (III) acetylacetonate, iron (III) sulfate, iron (III) acetate, iron(III) p-toluenesulfonate, or the like, or a combination thereof.

The amount of the 3,4-ethylenedioxythiophene vapor in the reactor is 20 to 80 volume percent, preferably 40 to 60 volume percent relative to the volume of the sum of the vapors of 3,4-ethylenedioxythiophene and the iron-salt. The amount of iron salt in the reactor is 20 to 80 volume percent, preferably 40 to 60 volume percent relative to the volume of the sum of the vapors of 3,4-ethylenedioxythiophene and the iron-salt. Other inert gases such as nitrogen and argon may be present in the reactor during the reaction.

The substrate upon which the film is disposed is an electrically insulating substrate. Electrically conducting substrates are those that have an electrical volume resistivity of less than or equal to $1 \times 10^{11}$ ohm-cm, while electrically conducting substrates are those that have an electrical volume resistivity of greater than $1 \times 10^{11}$ ohm-cm. The substrate may be in the form of a slab, a thin film or sheet having a thickness of several nanometers to several micrometers (e.g., 10 nanometers to 1000 micrometers), woven or nonwoven fibers, a fabric, a gel, a pixel, a particle, or the like. The substrate may have a smooth surface (e.g., not deliberately textured) or may be textured.

The substrate may have a surface area of a few square millimeters to several thousands of square meters. In an embodiment, the surface of the substrate may have a surface area of 10 square nanometers to 1000 square meters, preferably 100 square nanometers to 100 square meters, preferably 1 square centimeter to 1 square meter.

In an embodiment, electrically insulating substrates may include ceramic substrates, or polymeric substrates. Ceramic substrates include metal oxides, metal carbides, metal nitrides, metal borides, metal silicides, metal oxycarbides, metal oxynitrides, metal boronitrides, metal carbonitrides, metal borocarbides, or the like, or a combination thereof. Examples of ceramics that may be used as the substrate include silicon dioxide, aluminum oxide, titanium dioxide, zirconium dioxide, cerium oxide, cadmium-oxide, titanium nitride, silicon nitride, aluminum nitride, titanium carbide, silicon carbide, titanium niobium carbide, stoichiometric silicon boride compounds ($SiB_n$, where n=14, 15, 40, and so on) (e.g., silicon triboride, $SiB_3$, silicon tetraboride, $SiB_4$, silicon hexaboride, $SiB_6$, or the like), or the like, or a combination thereof.

Organic polymers that are electrically insulating may also be used as the substrate and may be selected from a wide variety of thermoplastic polymers, blend of thermoplastic polymers, thermosetting polymers, or blends of thermoplastic polymers with thermosetting polymers. The organic polymer may also be a blend of polymers, copolymers, terpolymers, or combinations comprising at least one of the foregoing organic polymers. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination comprising at last one of the foregoing organic polymers. The organic polymers have number average molecular weights greater than 10,000 grams per mole, preferably greater than 20,000 g/mole and more preferably greater than 50,000 g/mole.

Examples of the organic polymers are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polyethylene terephthalate, polybutylene terephthalate, polyurethane, polytetrafluoroethylene, perfluoroelastomers, fluorinated ethylene propylene, perfluoroalkoxyethylene, polychlorotrifluoroethylene, polyvinylidene fluoride, polysiloxanes, or the like, or a combination thereof.

Examples of polyelectrolytes are polystyrene sulfonic acid, polyacrylic acid, pectin, carrageenan, alginates, carboxymethylcellulose, polyvinylpyrrolidone, or the like, or a combination thereof.

Examples of thermosetting polymers include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination thereof.

The polymers and/or ceramics may be in the form of films, fibers, single strands of fiber, woven and non-woven fibers, woven fabrics, slabs, or the like, or a combination thereof. The fibers may be treated with surface modification agents (e.g., silane coupling agents) to improve adhesion if desired.

Exemplary substrates are flat sheets, such as paper, Tyvek, polymeric sheets including the polymer sheets listed above, porous, planar membranes, such as CELGARD®, or cylindrical or curved objects, such as monofilament NYLON® thread, single-ply silk thread, or monofilament fiberglass thread.

FIG. 1 details one exemplary embodiment of disposing the poly(3,4-ethylenedioxythiophene) on a substrate. In an embodiment, a reactor 102 having a first inlet port 104 for introducing the 3,4-ethylenedioxythiophene monomer and a second inlet port 108 for introducing the iron salt oxidant is used. The reactor may be connected to a source of pressure (e.g., a pump (not shown) that can be used to increase reactor pressure above that of the ambient atmosphere), or alternatively, a vacuum source 106 that can reduce the pressure below that of the atmosphere. In an embodiment, the reactor is provided with a vacuum source 106 that reduces the pressure in the reactor to 100 to 500 milliTorr. The reactor 102 is provided with a substrate stage 110 upon which is mounted a substrate 116 that is to be coated with the poly(3,4-ethylenedioxythiophene). The reactor stage may be heated to a temperature of −50° C. to 250° C., preferably 30° C. to 150° C. In an embodiment, the 3,4-ethylenedioxythiophene monomer may also be heated prior to being admitted to the reactor. The 3,4-ethylenedioxythiophene monomer may be heated to a temperature of 70 to 150° C., preferably 80 to 110° C. prior to being admitted to the reactor. QCM 112 is a quartz crystal microbalance that measures the thickness of the deposited polymer film in real time. The reactor does not contain any solvents and no solvents are used in either of the streams of vapor introduced into the reactor.

As may be seen in the FIG. 1, the iron salt is introduced into the reactor in the form of a vapor spray 114 that is conical in shape. The vapor spray may have shapes other than conical if desired. The vapor cone of the iron salt oxidant is created inside the reactor 102 using a Radak crucible heater. The reactor 102 may also contain a plurality of first inlet ports 104 and second inlet ports 108 (not shown) for increasing the substrate area upon which the polymer may be coated in a single pass.

Polymerization occurs in the regions 114 where the 3,4-ethylenedioxythiophene monomer vapor physically intersects with the iron salt oxidant vapor spray. The substrate stage comprises a flat copper plate, which can be heated to 30 to 120° C. that is placed in one such intersectional region. Conformal films of p-doped PEDOT are formed on any substrate 116, of any surface composition, surface morphology, surface topography or surface energy, affixed to this substrate stage.

After vapor deposition, substrates were rinsed for a suitable time in a solvent. Liquid aprotic polar solvents such as water, propylene carbonate, ethylene carbonate, butyrolactone, acetonitrile, benzonitrile, nitromethane, nitrobenzene, sulfolane, dimethylformamide, N-methylpyrrolidone, or the like, or combinations thereof are generally desirable. Polar protic solvents such as water, acetonitrile, nitromethane, alcohols (e.g., methanol, ethanol, propanol, isopropanol, butanol) or the like, or combinations thereof may be used. Other non-polar solvents such a benzene, toluene, methylene chloride, carbon tetrachloride, hexane, diethyl ether, tetrahydrofuran, or the like, or combinations comprising at least one of the foregoing solvents may also be used.

In an embodiment, methanol containing a concentrated acid may be used to remove unreacted oligomers, oxidants and undesirable side products. The poly(3,4-ethylenedioxythiophene)-coated substrates thus obtained did not contain any detectable traces of iron or iron salts.

The poly(3,4-ethylenedioxythiophene) film may have a thickness of 10 nm to 1000 micrometers, preferably 15 nanometers to 10 micrometers, and more preferably 20 nanometers to 5 micrometers. The poly(3,4-ethylenedioxythiophene) films thus obtained are uniformly p-doped throughout the entire volume of the film, as revealed by bulk optical absorption measurements.

The poly(3,4-ethylenedioxythiophene) film formed from vapor phase polymerization using an iron salt displays a rectangular shape for a cyclic voltammetry spectrum of up to 0.1 volts per second (V/s), indicating an ideal capacitive behavior of the polymer film on glass. This behavior is typically displayed in cyclic voltammetry scans of a 300 nm thick poly(3,4-ethylenedioxythiophene) film deposited on bare glass, obtained at scan rates ranging from 0.1 to 1 V/s. This behavior is displayed in the absence of a metal current collector, porous carbon material or transition metal oxide redox material. This behavior is typically displayed when comparative poly(3,4-ethylenedioxythiophene) films are formed on a metal current collector, porous carbon material or transition metal oxide redox material.

The PEDOT films thus obtained are uniformly p-doped throughout the entire volume of the film, as revealed by bulk optical absorption measurements. In an embodiment, they have a dopant concentration of $10^{10}$ atoms per cm$^3$ to $10^{20}$ atoms per cm$^3$. The poly(3,4-ethylenedioxythiophene) films have a capacitance of 0.1 to 50 milliFarads (mF), preferably 0.5 to 40 milliFarads and more preferably 1.0 to 35 milliFarads.

The method of manufacturing the ideal capacitive poly (3,4-ethylenedioxythiophene) films and articles containing the same are detailed in the following non-limiting examples.

EXAMPLE

Example 1

This example was conducted to demonstrate the method of manufacturing the poly(3,4-ethylenedioxythiophene).

Highly p-doped films of poly(3,4-ethylenedioxythiophene) (p-doped PEDOT) are directly deposited onto any substrate of choice via in situ vapor polymerization of 3,4-ethylenedioxythiophene (EDOT).

Vapor phase polymerization is carried out in a reactive vacuum chamber (the reactor) at 100 to 500 mTorr pressure. EDOT vapor is introduced into the reactor via a side inlet. A vapor cone of a reactive oxidant, such as iron (III) chloride, iron (III) bromide, iron (III) acetylacetonate, or iron (III) acetate is created inside the vacuum chamber using a Radak crucible heater. Polymerization occurs in the regions where the EDOT vapor physically intersected with the oxidant vapor. A substrate stage comprising a flat copper plate, which can be heated between 30 to 120° C., is placed in one such intersectional region. Conformal films of p-doped PEDOT are formed on any substrate, of any surface composition, surface morphology, surface topography or surface energy, affixed to this substrate stage.

After vapor deposition, substrates are rinsed for 2 minutes in methanol containing 1% by volume concentrated sulfuric acid to remove unreacted oligomers, oxidants and undesirable side products. The PEDOT-coated substrates thus obtained do not contain any detectable traces of iron or iron salts. PEDOT film thicknesses range from 30 nanometers (nm) to 2 micrometers. The PEDOT films thus obtained are uniformly p-doped throughout the entire volume of the film, as revealed by bulk optical absorption measurements.

Example 2

This example was conducted to demonstrate the capacitive properties of the poly(3,4-ethylenedioxythiophene) manufactured as demonstrated in Example 1.

Figure 2:
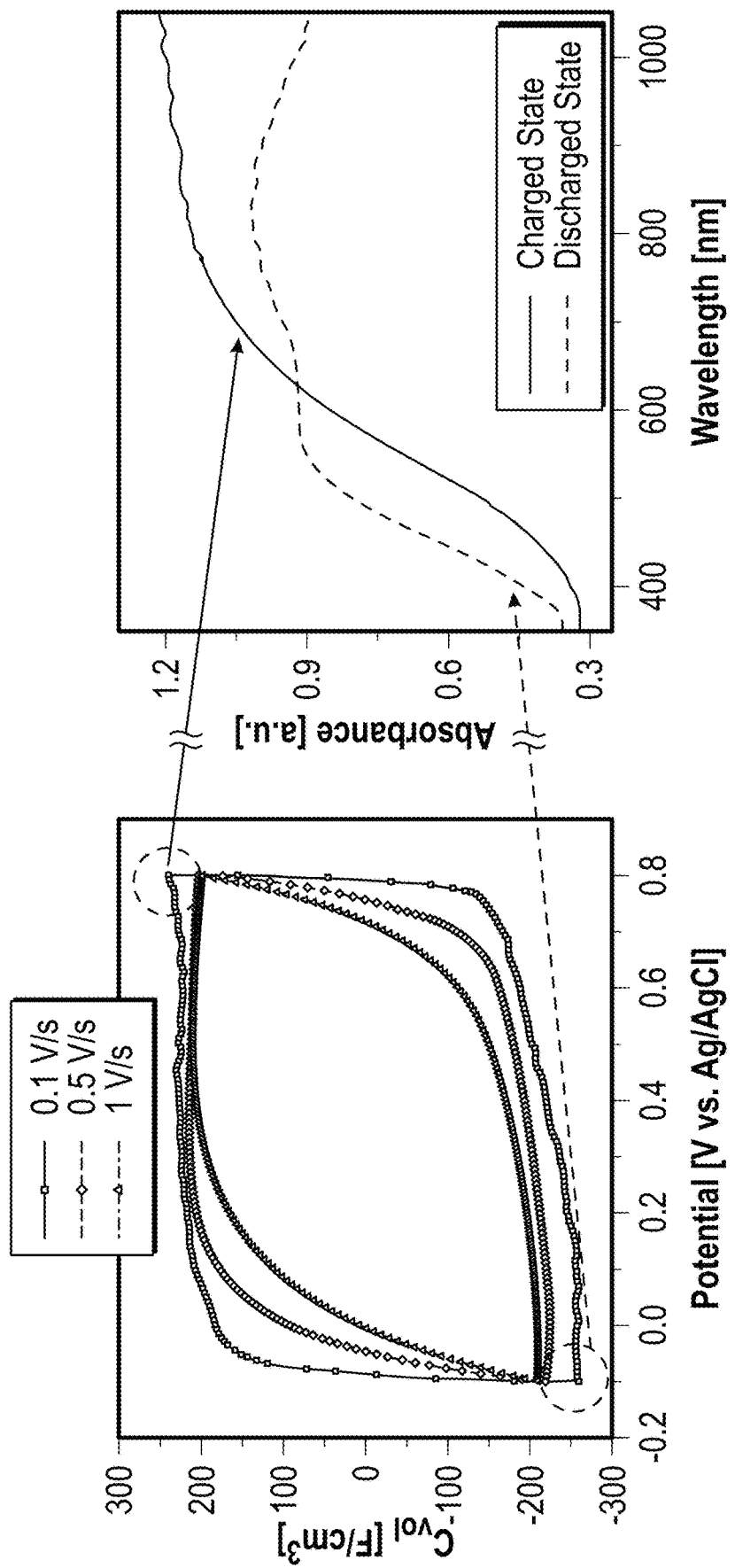
FIG. 2A show cyclic voltammetry scans of a 300 nm thick PEDOT film deposited on bare glass, obtained at scan rates ranging from 0.1-1 V/s.
FIG. 2B shows absorbance data for the films of the FIG. 2A.

FIG. 2A show cyclic voltammetry (CV) scans of a 300 nm thick PEDOT film deposited on bare glass, obtained at scan rates ranging from 0.1-1 V/s. The rectangular shape of the CV spectrum is maintained up to 0.1 V/s, indicating an ideal capacitive behavior of the polymer film on glass, in the absence of a metal current collector, or porous carbon material or transition metal oxide redox material. The efficient charge collection without a metal current collector may be explained by the absorbance spectra (taken in the near infrared (NIR) region) seen in the FIG. 2B.

FIG. 2A shows the CV profiles of a 300 nm thick PEDOT film deposited on bare glass, while FIG. 2B shows the absorbance spectra of the film measured at the charged state (red) and at the discharged state (black). The films that are electrochemically oxidized or partially neutralized were removed from the CV apparatus, rinsed with a few drops of distilled water to remove electrolyte on the surface followed by drying in air before the absorbance measurement.

The oxidized state of polymer film displays only polaron or bipolaron absorption in the near infrared (NIR) region.

The less oxidized polymer still possesses a significant amount of polarons or bipolarons comparable to the amount of neutral units, which is revealed by the absorbance in the visible region (corresponding to $\pi$-$\pi^*$ transition of polymer backbone). This remaining portion of the charged units guarantees efficient charge transport and collection at the less oxidized state, which is commonly considered as the neutral and insulating state.

Example 3

Figure 3:
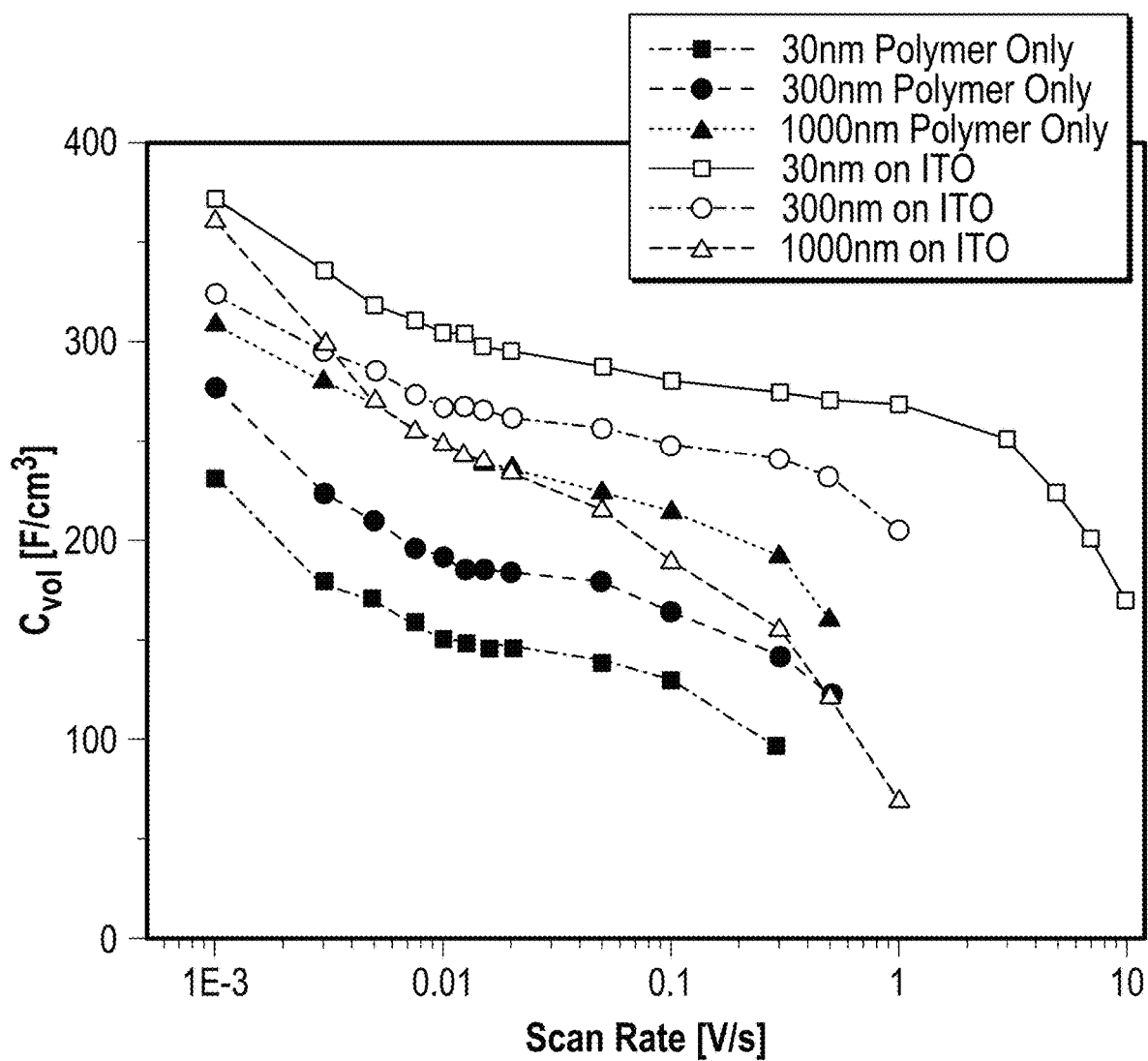
FIG. 3 shows the thickness dependence of volumetric capacitance of the p-doped PEDOT films on bare glass (without a current collector) and on ITO-coated glass (with a current collector)

This example was conducted to demonstrate the thickness dependence of volumetric capacitance. FIG. 3 shows the thickness dependence of volumetric capacitance of the p-doped PEDOT films on bare glass (without a current collector) and on ITO-coated glass (with a current collector). The PEDOT films on bare glass (without a current collector) all display volumetric capacitance values that are of the same order of magnitude as the PEDOT films on ITO (with the current collector), further supporting the claim that the PEDOT films lacking a current collector are capable of serving as single-component electrodes for supercapacitors. Indeed, the value of the volumetric capacitance at 0.001 V/s for 1 micrometer thick PEDOT film on glass is the same as that of 30 nm thick PEDOT film on ITO-coated glass.

For the PEDOT films on ITO-coated glass, the PEDOT simply serves as a redox active layer while the PEDOT/ITO/glass structure is a pseudocapacitive electrode. The PEDOT film on bare glass serves as both a redox active layer and current collector and the PEDOT/glass structure is a hybrid supercapacitor electrode.

Figure 4:
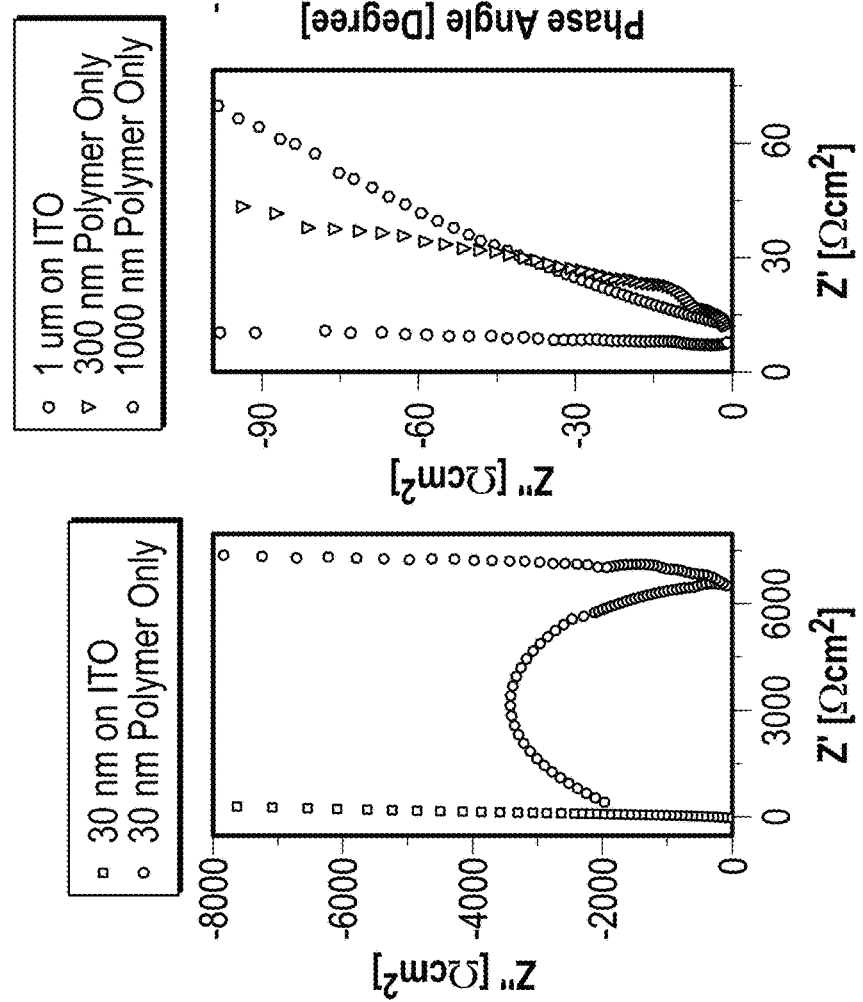
FIG. 4A depicts a Nyquist plot of 30 nm PEDOT film on ITO-coated or bare glass.
FIG. 4B is a graph showing 300 and 1000 nm PEDOT film on bare glass and a 1000 nm PEDOT film on ITO.
FIG. 4C shows a Bode plot of phase angle versus frequency of the aforementioned films.

FIG. 4A depicts a Nyquist plot of 30 nm PEDOT film on ITO-coated or bare glass.

FIG. 4B is a graph showing 300 and 1000 nm PEDOT film on bare glass and a 1000 nm PEDOT film on ITO while FIG. 4C shows a Bode plot of phase angle versus frequency of the aforementioned films.

The Nyquist plots of polymer films may be used to explain the thickness dependence of volumetric capacitance. While a 30 nm PEDOT film without a current collector shows a significant semi-circle associated with a combined resistance contributed by the bulk of the film as well as the interfaces, 300 and 1000 nm thick polymer films without a current collector show spectra that are close to that of an ideal capacitor similar to all PEDOT films on ITO. The corresponding time constant (obtained by the inverse of the frequency at which −45° is reached in the Bode phase plot in FIG. 4C) reveals a high-thickness dependence with ITO current collector, which is 0.08 seconds for a 30 nm film and is 3 seconds for a 1000 nm film, and a slight-thickness dependence without the ITO current collector namely 0.6 seconds and 0.9 seconds for 30 nm and 1000 nm respectively. This implies a uniform ion and/or charge diffusion in polymer films without the use of a charge collector.

Example 4

Figure 5:
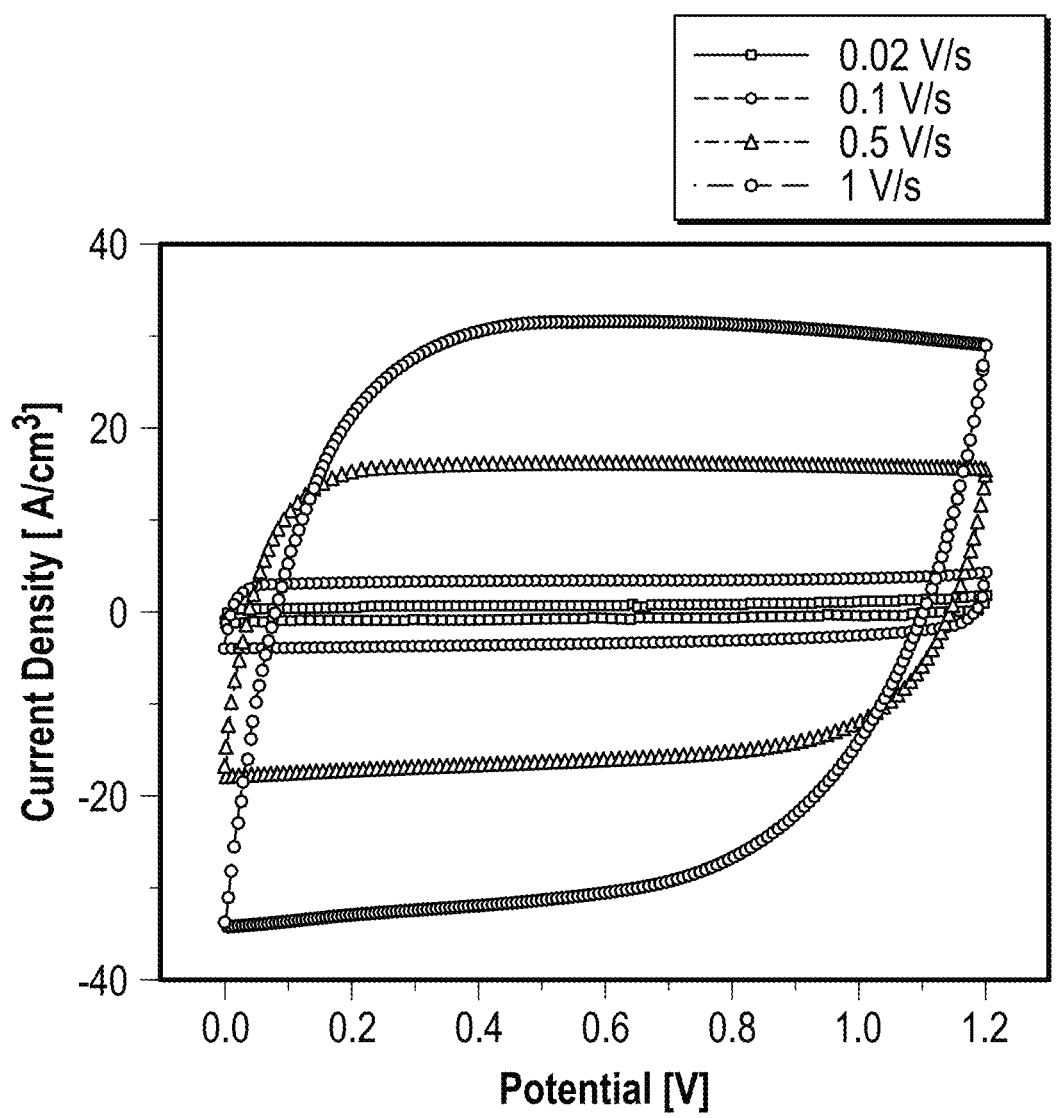
FIG. 5 shows the cyclic voltammogram scan of one such electrode that comprises a 1 micrometer thick PEDOT film disposed on an insulating Kapton® (polyimide sheet)
Figure 6:
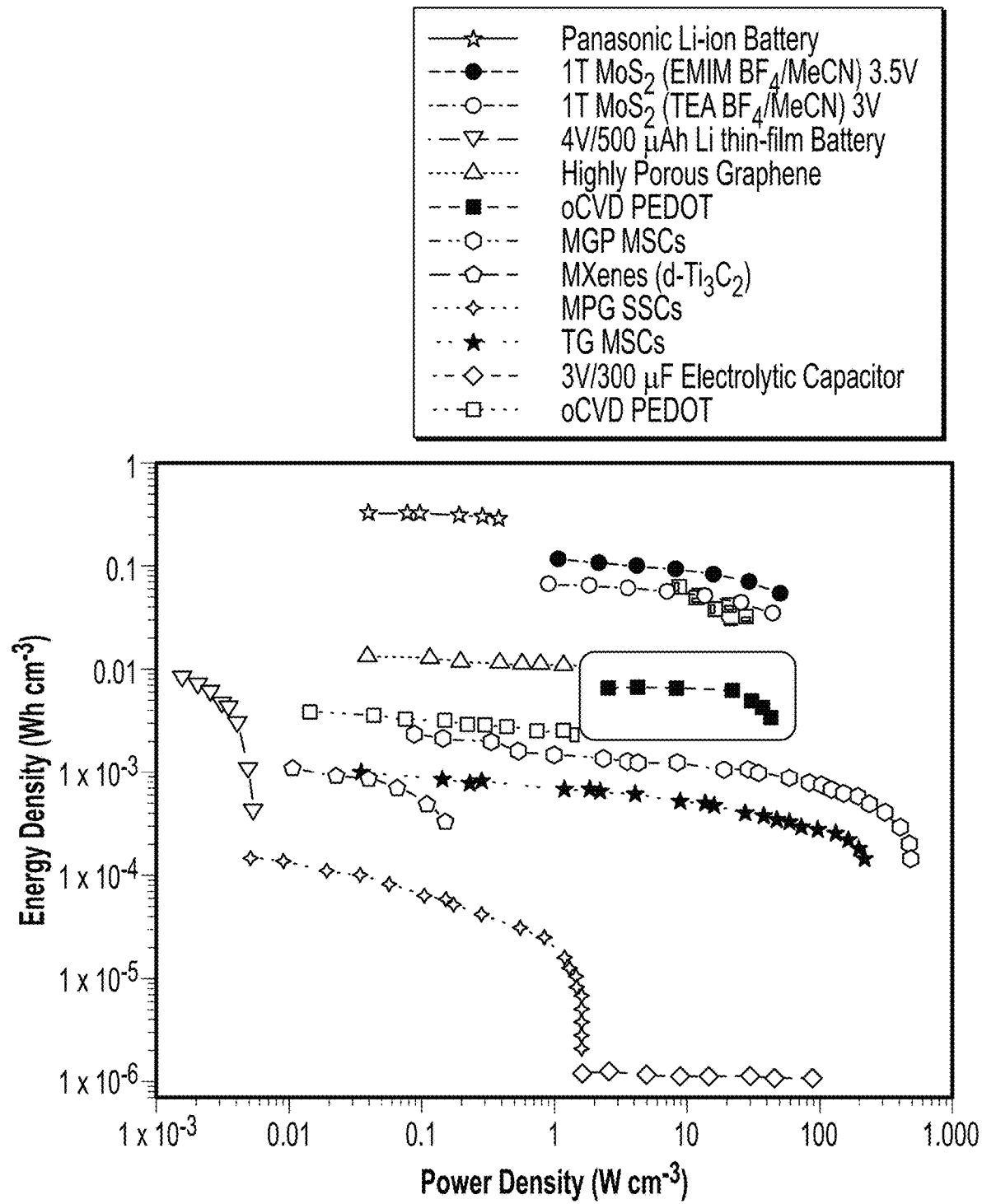
FIG. 6 is a graph that shows the energy density obtained versus power density for symmetric two-electrode supercapacitors made using PEDOT-coated Kapton® with a polyvinylacetate (PVA)/lithium chloride solid gel electrolyte.

This example details different configurations that the supercapacitor comprising PEDOT may be deployed in. Electrodes for supercapacitors were created by vapor coating a selection of insulating substrates with one layer of p-doped PEDOT. Substrates could be flat sheets, such as paper, Tyvek, Kapton (polyimide) plastic sheets, polyethylene plastic sheets, or polyethylene terephthalate plastic sheets, or porous, planar membranes, such as CELGARD®, or cylindrical or curved objects, such as monofilament NYLON® thread, single-ply silk thread, or monofilament fiberglass thread. FIG. 5 shows the cyclic voltammogram scan of one such electrode that comprises a 1 micrometer thick PEDOT film disposed on an insulating KAPTON® (polyimide sheet). The rectangular shape of the cyclic voltammogram is maintained up to 0.5 V/s, indicating ideal capacitive behavior, even in the presence of a metal or transition metal oxide current collector. FIG. 6 is a graph that shows the energy density obtained versus power density for symmetric two-electrode supercapacitors made using PEDOT-coated KAPTON®, with a polyvinylacetate (PVA)/lithium chloride solid gel electrolyte.

Example 5

Figure 7:
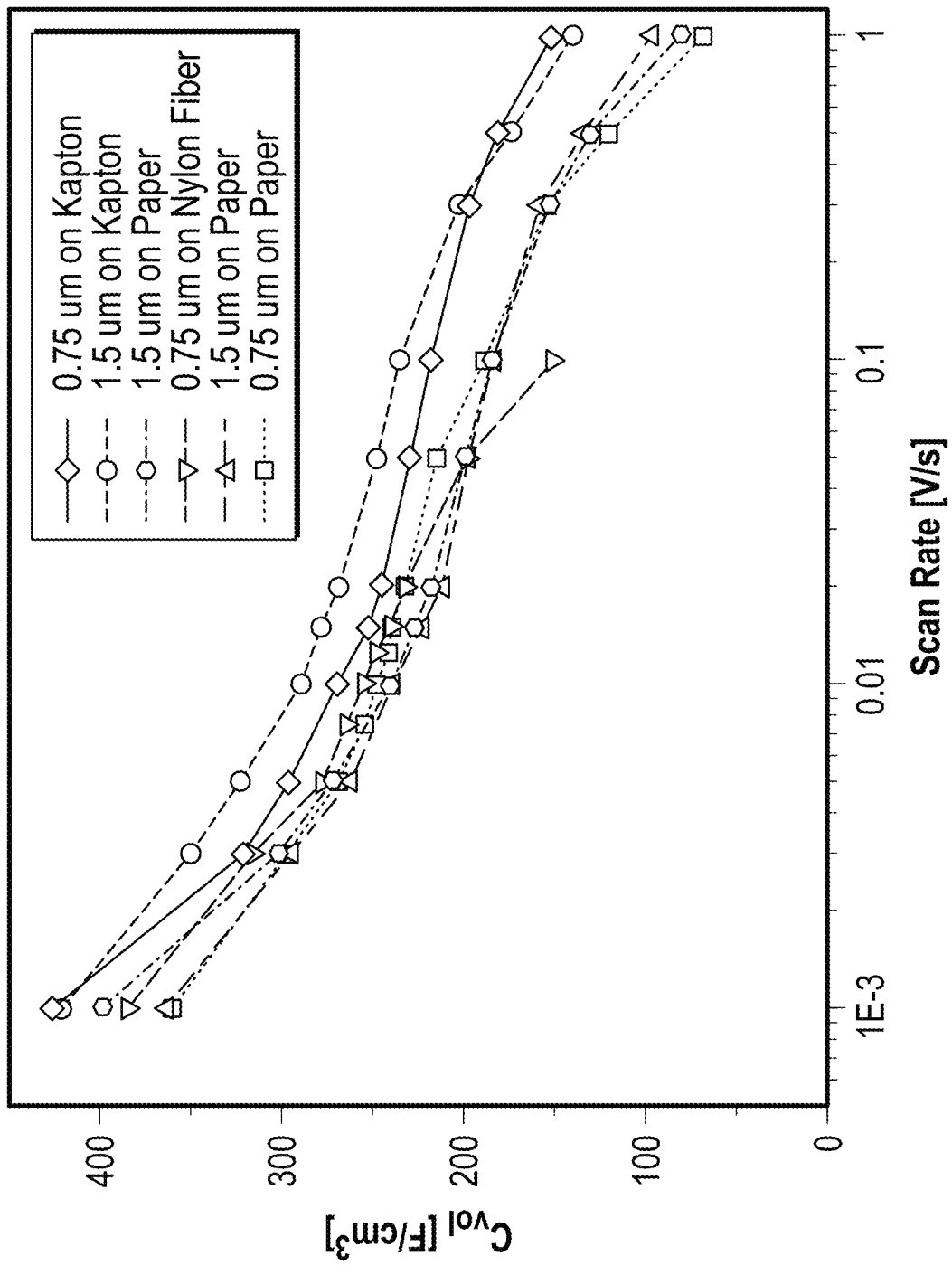
FIG. 7 is a graph that depicts volumetric capacitance of PEDOT films (0.75 or 1.5 μm) deposited on flexible substrates KAPTON® film, TYVEK® paper or nylon single filament thread, showing nearly substrate independent capacitance.

This example was conducted to determine if the capacitance is affected by the chemistry or by the nature of the backing (substrate). PEDOT films were vapor deposited on KAPTON® films, NYLON® threads, and paper films. The thickness ranged from 0.75 micrometers and 1.5 micrometers on KAPTON, 0.75 micrometers on Nylon threads and 0.75 micrometers and 1.5 micrometers on paper. FIG. 7 is a graph that shows the volumetric capacitance for the vapor-deposited PEDOT layer of varying thickness on the various insulating substrates. The volumetric capacitance at 0.001 V/s obtained for these current collector-free electrodes is approximately 400 F/cm$^3$, which is comparable to other hybrid electrodes containing a metal current collector. FIG. 7 shows nearly substrate independent capacitance, i.e., the capacitance is independent of the chemistry or the nature of the substrate.

FIGS. 8A-8F depict schematics of device configurations for flexible, metal current collector-free supercapacitor devices that can be fabricated using the PEDOT-coated electrodes described herein. The device configurations include a first electrically insulating substrate with a first layer of the p-doped PEDOT disposed thereon to form a first coated substrate and a second electrically insulating substrate with a second layer of the p-doped PEDOT disposed thereon to form a second coated substrate. The first and the second substrate layers are electrically insulating prior to the deposition of the p-doped PEDOT layer. A dielectric layer (an electrically insulating layer) is disposed between the first coated substrate and the second coated substrate prevents the two coated layers from communicating electrically with one another. The coated substrates act as both a redox-active material and a current collector.

In an embodiment, the first electrically insulating substrate and the second electrically insulating substrate are selected from the group consisting of a fiber, a film, a woven fiber, a slab, a fabric, a gel, a pixel, a particle, or a combination thereof. In another embodiment, the electrically insulating layer is selected from the group consisting of a fiber, a film, a woven fiber, a slab, a fabric, a gel, a pixel, a particle, or a combination thereof. In yet another embodiment, the electrically insulating layer has the same chemical composition and form as the first electrically insulating substrate and/or the second electrically insulating substrate. For example, if the first electrically insulating substrate and the second electrically insulating substrate are polyester fibers, the electrically insulating layer disposed between the first electrically insulating substrate and the second electrically insulating substrate also comprises a polyester fiber. A gel electrolyte may contact the first coated substrate and the second coated substrate if desired.

Figure 8A:
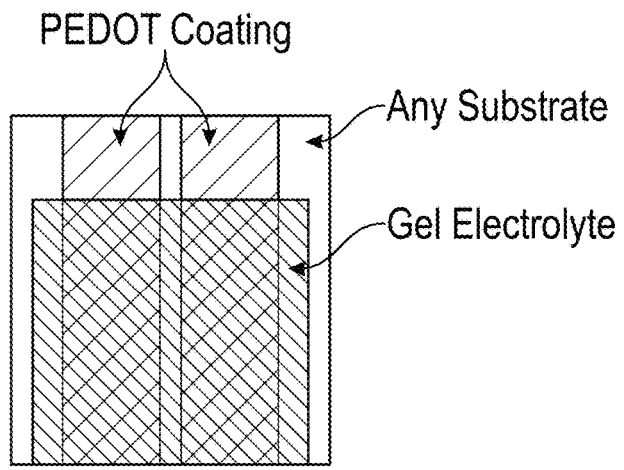
FIG. 8A depicts one configuration of capacitance devices that employ the PEDOT layer detailed herein.
Figure 8B:
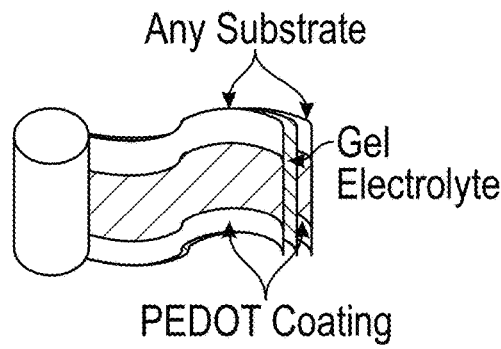
FIG. 8B shows another schematic diagram of a capacitance device that comprises a layer of a gel electrolyte disposed between two tapes each of which comprise a substrate upon which is disposed a layer of the p-doped PEDOT material disclosed herein.

FIGS. 8A and 8B show various configurations of capacitance devices that employ the PEDOT layer detailed herein. FIG. 8A shows a schematic diagram of a layer of a gel electrolyte disposed on and in contact with parallel p-doped PEDOT layers disposed on a substrate. The substrate may comprise any of the electrically insulating materials (ceramics and/or polymers) listed above. The gel electrolyte can comprise poly(vinyl alcohol (PVA), poly(methyl methacrylate) (PMMA), poly(vinylidene difluoride) (PVDF), polyethylene oxide (PEO), brand-name membrane separators, such as CELGARD saturated with solvated electrolytes.

FIG. 8B shows another schematic diagram of a capacitance device that comprises a layer of a gel electrolyte disposed between two tapes each of which comprise a substrate upon which is disposed a layer of the p-doped PEDOT material disclosed herein. The PEDOT layers contact the layer of the gel electrolyte.

Figure 8C:
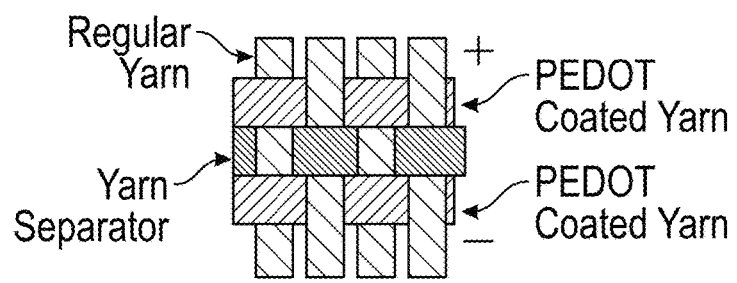
FIG. 8C depicts a schematic of an exemplary embodiment a capacitance device that comprises woven yarn, where one set of yarn fibers are coated with the p-doped PEDOT layer disclosed herein.

FIG. 8C depicts a schematic of an exemplary embodiment a capacitance device that comprises woven yarn, where one set of yarn fibers are coated with the p-doped PEDOT layer disclosed herein. The fibers coated with the p-doped PEDOT material travel in a first direction and are woven with non-coated fibers that travel in a second direction. The first direction is different from the second direction. A yarn separator separates successive fibers coated with the p-doped PEDOT material from each other.

Figure 8D:
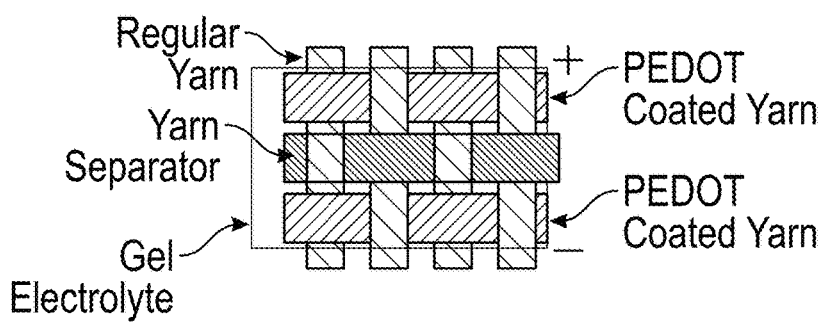
FIG. 8D depicts another schematic of an exemplary embodiment of a capacitance device that comprises the device of the FIG. 8C, with a layer of a gel electrolyte disposed thereon.

FIG. 8D depicts another schematic of an exemplary embodiment of a capacitance device that comprises the device of the FIG. 8C, with a layer of a gel electrolyte disposed thereon.

Figure 8E:
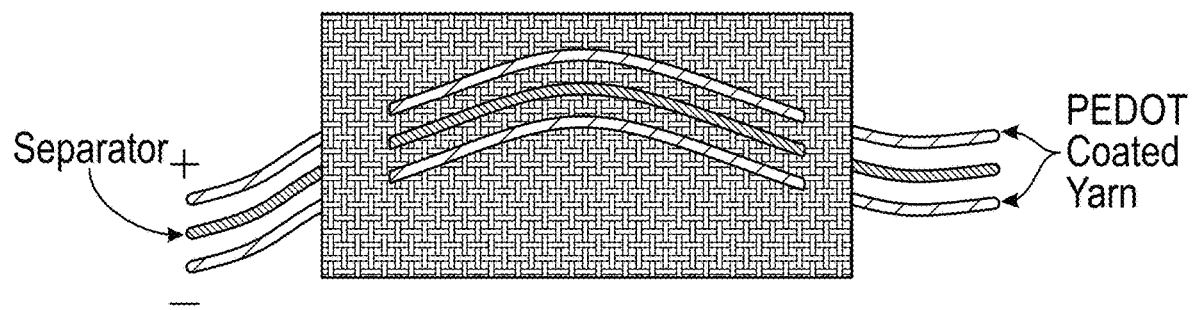
FIG. 8E depicts another schematic of an exemplary embodiment of a capacitance device that comprises strands of a yarn that are coated with the disclosed p-doped PEDOT material.

FIG. 8E depicts another schematic of an exemplary embodiment of a capacitance device that comprises strands of a yarn that are coated with the disclosed p-doped PEDOT material. Successive strands of the yarn that are coated with the disclosed p-doped PEDOT material are separated by a non-coated yarn separator. The respective strands of yarn may be supported by being threaded through a woven fabric or by being in contact with a second substrate that can provide the requisite support without any electrical interference. The woven fabric provides mechanical support to the coated strands of yarn.

Figure 8F:
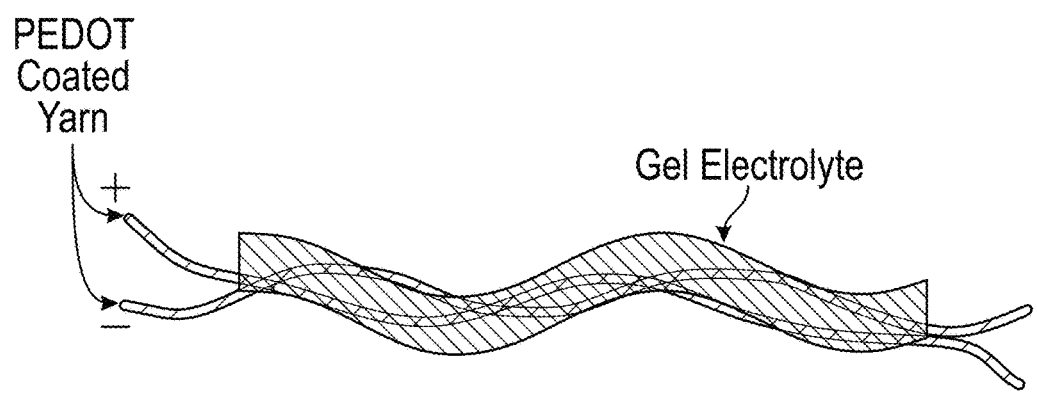
FIG. 8F depicts another schematic of an exemplary embodiment of a capacitance device that comprises strands of a yarn that are contained in a gel electrolyte that separates the strands while at the same time providing suitable mechanical support.

FIG. 8F depicts another schematic of an exemplary embodiment of a capacitance device that comprises strands of a yarn that are contained in a gel electrolyte that separates the strands while at the same time providing suitable mechanical support.

Example 6

Figure 9A:
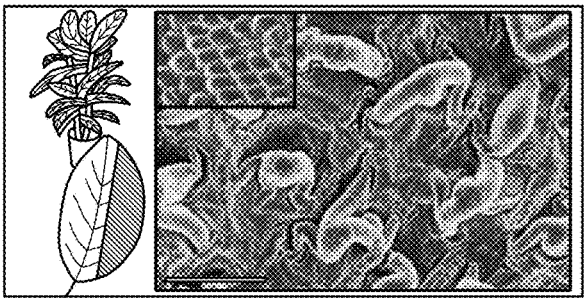
FIG. 9A shows a *Calathea zebrine* leaf that was used as a substrate.
Figure 9B:
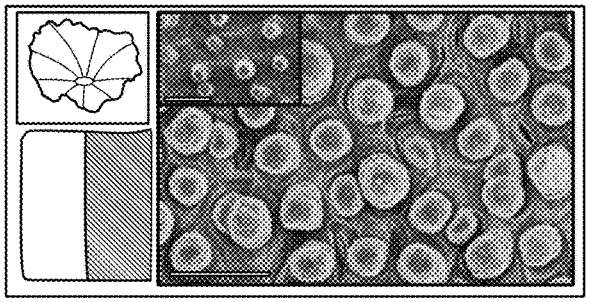
FIG. 9B shows a lotus leaf that was used as a substrate.
Figure 9C:
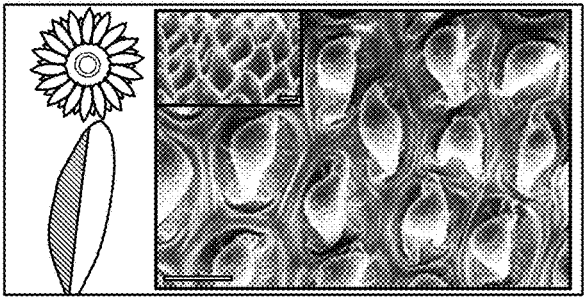
FIG. 9C shows a sunflower that was used as a substrate.
Figure 9D:
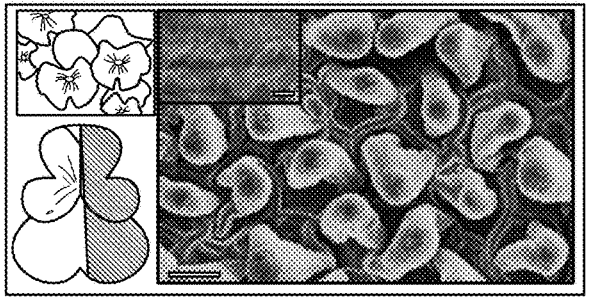
FIG. 9D shows a pansy that was used as a substrate.
Figure 9E:
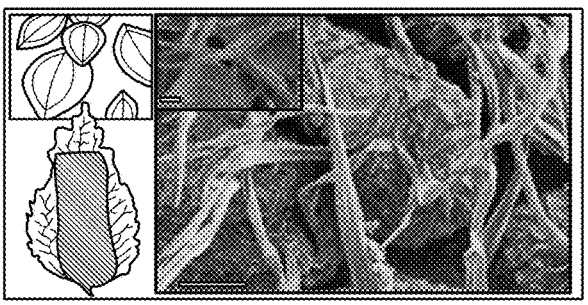
FIG. 9E shows a *Pilea involucrata* leaf that was used as a substrate.
Figure 9F:
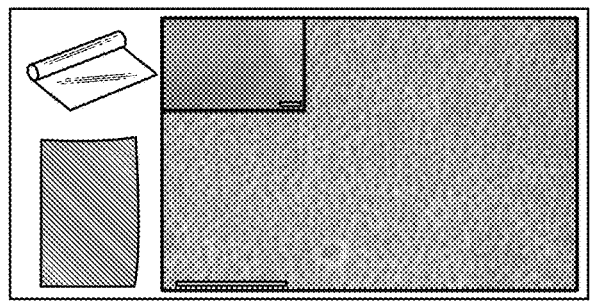
FIG. 9F shows a KAPTON film that was used as a substrate.

This example was conducted on a variety of different substrates. The substrates were coated in a reactor with the disclosed p-doped PEDOT material in a manner similar to that described in Example 1. FIGS. 9A-9F show the various materials that were used as the substrate. FIG. 9A shows a *Calathea zebrine* leaf that was used as a substrate. FIG. 9B shows a lotus leaf that was used as a substrate. FIG. 9C shows a sunflower that was used as a substrate. FIG. 9D shows a pansy that was used as a substrate. FIG. 9E shows a *Pilea involucrata* leaf that was used as a substrate. FIG. 9F shows a KAPTON film that was used as a substrate. In each of the FIGS. 9A through 9F, the image on the left is an optical image. The photomicrographs to the right of the optical image are those of p-doped PEDOT coated materials obtained using a scanning electron microscope, while the smaller inset image is that obtained via a scanning electron microscope of the material before being coated.

Figure 9G:
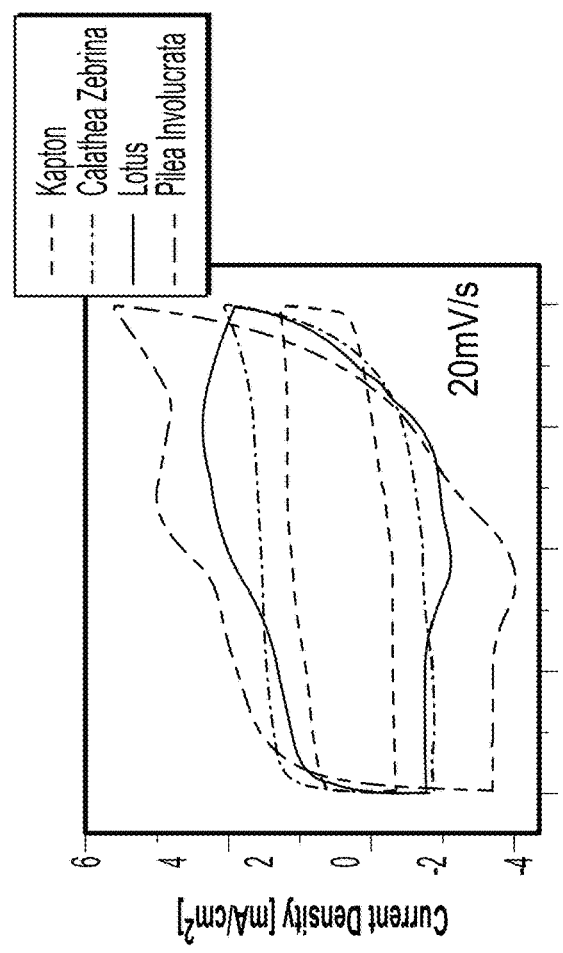
FIG. 9G is a graph of current density versus potential showing cyclic voltammetry results for the KAPTON film, the sunflower and the pansy.
Figure 9H:
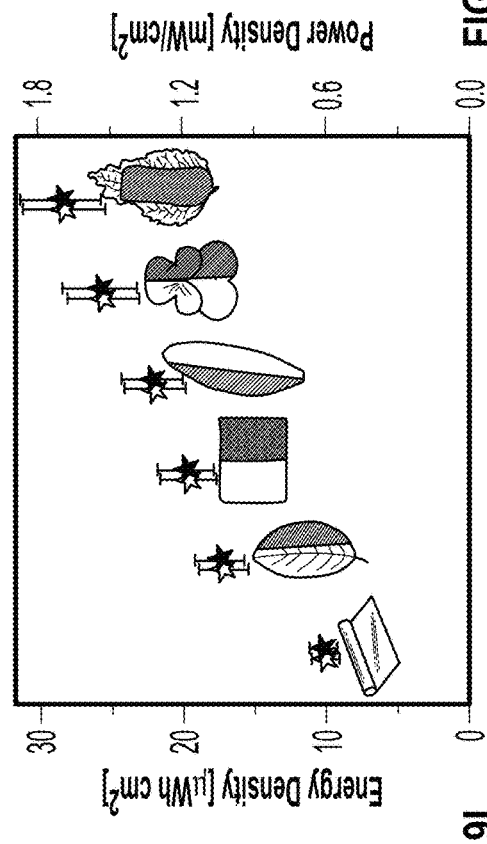
FIG. 9H shows cyclic voltammetry results for the same KAPTON film, the *Calathea zebrine* leaf, the *Pilea involucrata* leaf, and the lotus flower.
Figure 9I:
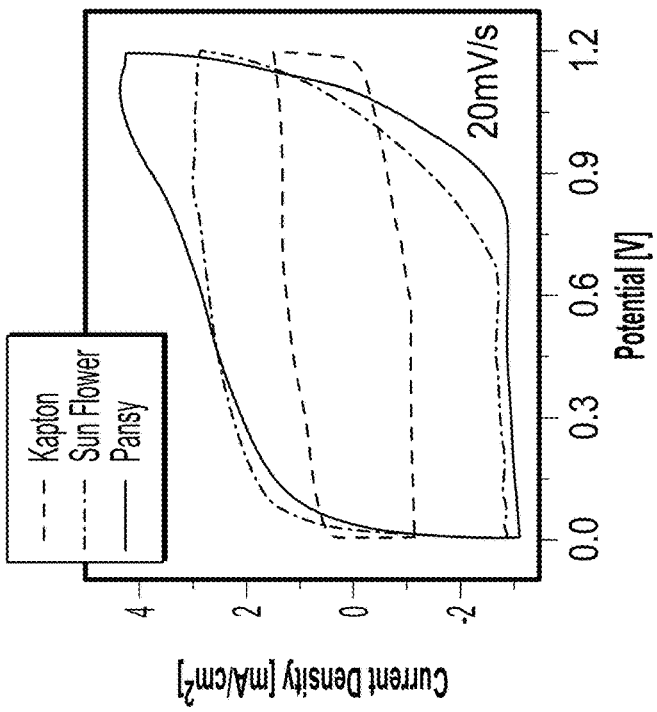
FIG. 9I is a graph depicting areal capacitance for the substrates shown in the FIGS. 9A-9F.
Figure 9J:
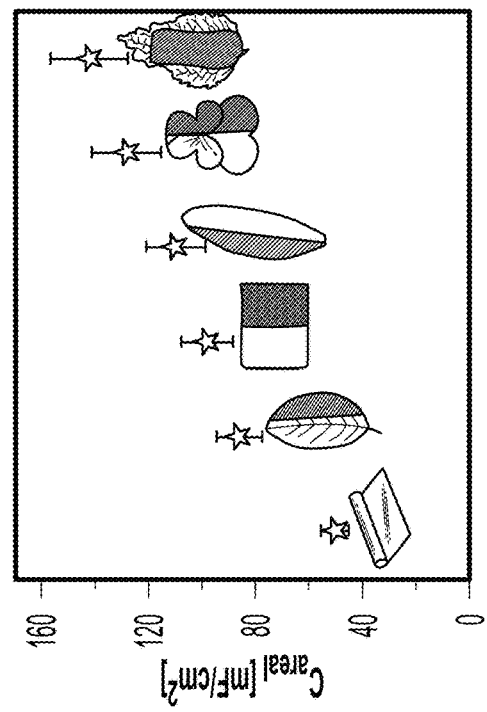
FIG. 9J is a graph depicting areal energy density and power density for the substrates shown in the FIGS. 9A-9F.

FIGS. 9G-9J depict cyclic voltammetry results performed on the substrates shown in the FIGS. 9A-9F. FIG. 9G is a graph of current density versus potential showing cyclic voltammetry results for the KAPTON film, the sunflower and the pansy, while FIG. 9H shows cyclic voltammetry results for the same KAPTON film, the *Calathea zebrine* leaf, the *Pilea involucrata* leaf, and the lotus flower. In the FIGS. 9G and 9H, CVs of symmetric ECs fabricated on leaves or petals were compared to the Kapton film substrate with 0.5 M $H_2SO_4$ aqueous electrolyte at scan rate of 20 mV/s. FIGS. 9I and 9J is a graph depicting areal capacitance (See FIG. 9I), areal energy density and power density (See FIG. 9J) of symmetric ECs calculated from CVs in (FIG. 9G) and (FIG. 9H).

Example 7

Figure 10A:
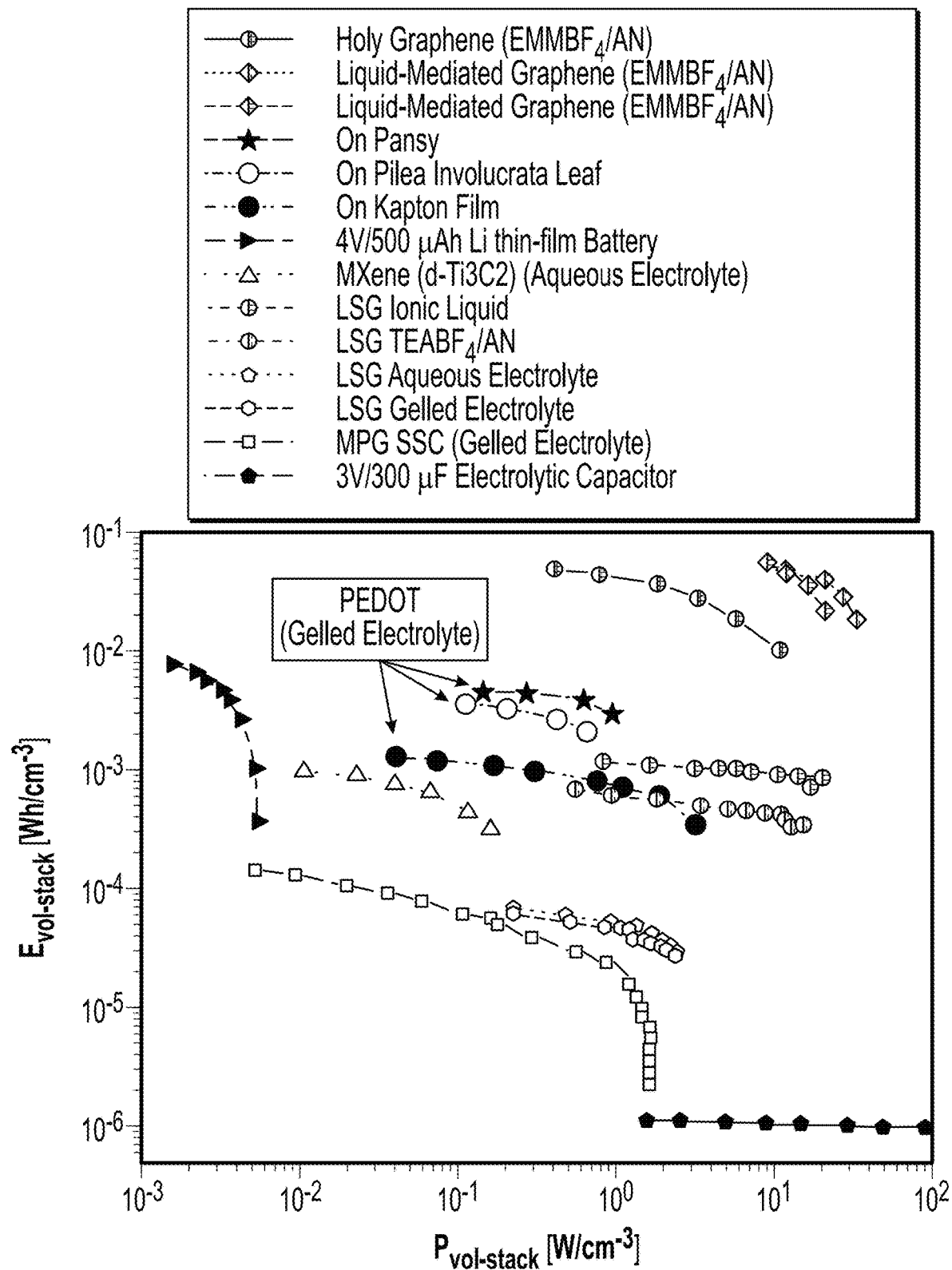
FIG. 10A is a Ragon plot of power and energy densities normalized to the volume of device by taking into account the electrodes/substrates and separator.
Figure 10B:
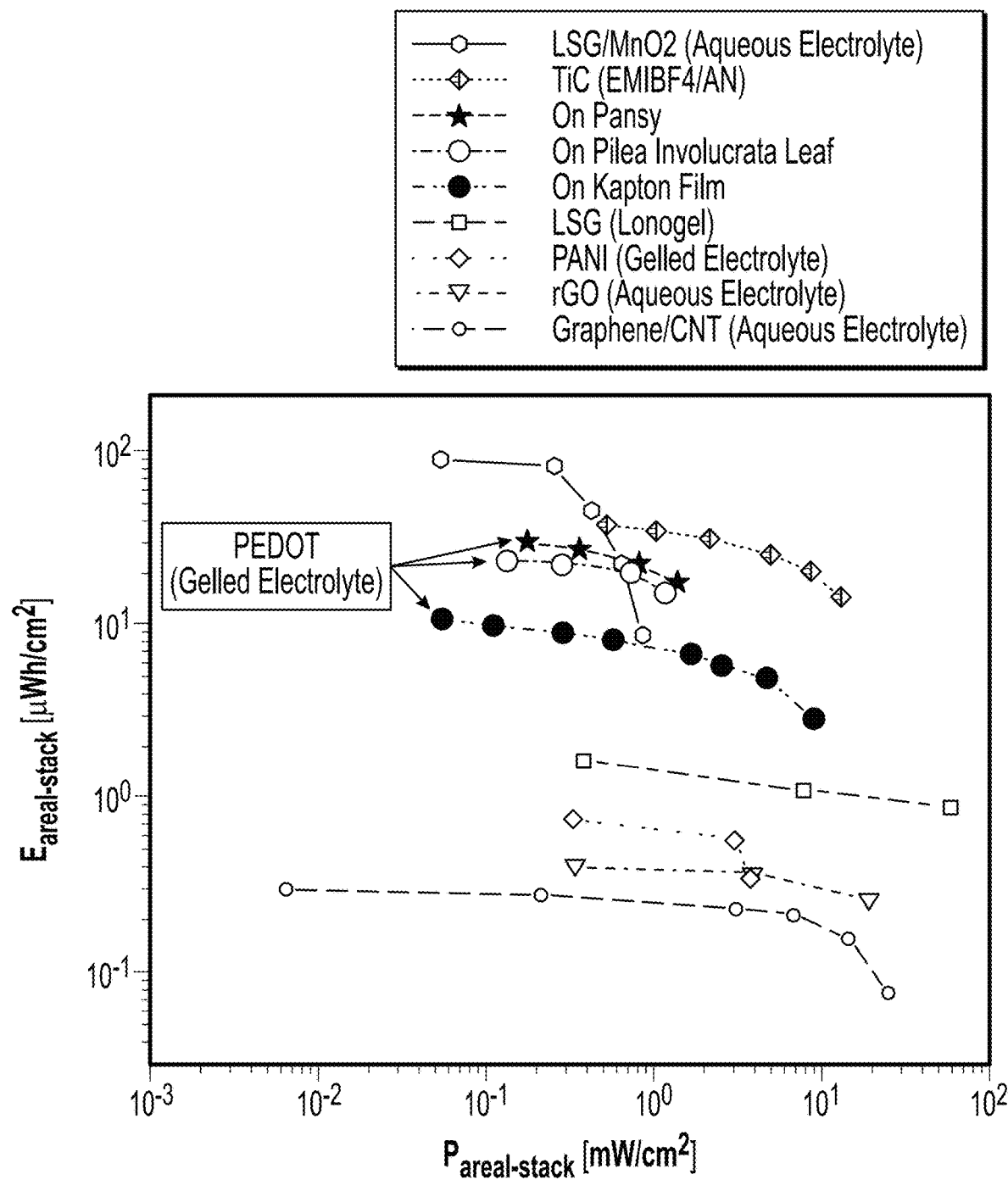
FIG. 10B is a Ragon plot of power and energy densities normalized to the area of device.

This example demonstrates the best power and energy densities for articles comprising the p-doped PEDOT coated materials. Ragon plots of the best power and energy densities obtained from two-electrode supercapacitors created on plastic or bio-renewable substrates. FIG. 10A is a Ragon plot of power and energy densities normalized to the volume of device by taking into account the electrodes/substrates and separator. The solid symbols represent aqueous or gelled electrolytes, while the half solid symbols represent organic or ionic liquid electrolytes. FIG. 10B is a Ragon plot of power and energy densities normalized to the area of device. The solid symbols represent aqueous or gelled electrolytes, while the half solid symbols represent ionic liquid electrolytes.

It is to be noted that all ranges detailed herein include the endpoints. Numerical values from different ranges are combinable.

The transition term comprising encompasses the transition terms "consisting of" and "consisting essentially of".

The term "and/or" includes both "and" as well as "or". For example, "A and/or B" is interpreted to be A, B, or A and B.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An electrically insulating article comprising:
    a p-doped poly(3,4-ethylenedioxythiophene) layer disposed on an electrically insulating substrate; and
    an electrically insulating layer that comprises a gel disposed on the p-doped poly(3,4-ethylenedioxythiophene) layer, where the p-doped poly(3,4-ethylenedioxythiophene) layer is manufactured by a method comprising:
        charging a vapor comprising 3,4-ethylenedioxythiophene into a reactor; where the reactor comprises the electrically insulating substrate;
        charging a vapor comprising an iron salt into the reactor;
        polymerizing the 3,4-ethylenedioxythiophene with the iron salt to form the p-doped poly(3,4-ethylenedioxythiophene) layer; and
        disposing the p-doped poly(3,4-ethylenedioxythiophene) layer on the electrically insulating substrate; and where the p-doped poly(3,4-ethylenedioxythiophene) layer is in direct contact with the electrically insulating substrate and with the electrically insulating layer that comprises the gel.

2. The electrically insulating article of claim 1, where the p-doped poly(3,4-ethylenedioxythiophene) layer is uniformly doped having a dopant concentration of $10^{10}$ atoms per $cm^3$ to $10^{20}$ atoms per $cm^3$ and a concentration variation of $\pm 10^3$ atoms per $cm^3$.

3. The electrically insulating article of claim 1, where the polymerizing occurs in a vapor phase of the vapor comprising 3,4-ethylenedioxythiophene.

4. The electrically insulating article of claim 1, where the p-doped poly(3,4-ethylenedioxythiophene) layer has a capacitance of 0.1 to 50 milliFarads.

5. The electrically insulating article of claim 1, where the electrically insulating substrate comprises a ceramic and/or a polymer.

6. The electrically insulating article of claim 5, where the ceramic is silica.

7. The electrically insulating article of claim 5, where the polymer is at least one selected from the group comprising a polyacetal, a polyolefin, a polyacrylic, a polycarbonate, a polystyrene, a polyester, a polyamide, a polyamideimide, a polyarylate, a polyarylsulfone, a polyethersulfone, a polyphenylene sulfide, a polyvinyl chloride, a polysulfone, a polyimide, a polyetherimide, a polytetrafluoroethylene, a polyetherketone, a polyether etherketone, a polyether ketone ketone, a polybenzoxazole, a polyphthalide, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polyethylene terephthalate, polybutylene terephthalate, polyurethane, polytetrafluoroethylene, perfluoroelastomers, fluorinated ethylene propylene, perfluoroalkoxyethylene, polychlorotrifluoroethylene, polyvinylidene fluoride, polysiloxanes, or a combination thereof.

8. The electrically insulating article of claim 5, where the ceramic is at least one selected from the group comprising metal oxides, metal carbides, metal nitrides, metal borides, metal silicides, metal oxycarbides, metal oxynitrides, metal boronitrides, metal carbonitrides, metal borocarbides, or a combination thereof.

9. The electrically insulating article of claim 1, where the electrically insulating substrate is in the form of a single fiber, a sheet, a slab, a woven or non-woven fiber, a fabric, a gel, a pixel, a particle, or a combination thereof.

10. The electrically insulating article of claim 1, where the electrically insulating substrate comprises paper.

11. The electrically insulating article of claim 1, where the electrically insulating substrate is an electrode.

12. An article comprising:
a first electrically insulating substrate upon which is disposed a first p-doped poly(3,4-ethylenedioxythiophene) layer to form a first coated substrate;
a second electrically insulating substrate upon which is disposed a second p-doped poly(3,4-ethylenedioxythiophene) layer to form a second coated substrate; and
an electrically insulating layer disposed between the first coated substrate and the second coated substrate; where the electrically insulating layer prevents electrical communication between the first electrically insulating substrate and the second electrically insulating substrate; where the electrically insulating layer comprises a gel; where the first p-doped poly(3,4-ethylenedioxythiophene) layer is in direct contact with the first electrically insulating substrate and with the electrically insulating layer; and where the second p-doped poly(3,4-ethylenedioxythiophene) layer is in direct contact with the second electrically insulating substrate and with the electrically insulating layer.

13. The article of claim 12, wherein the first electrically insulating substrate and the second electrically insulating substrate are selected from the group consisting of a fiber, a film, a slab, a fabric, a gel, a pixel, a particle, or a combination thereof.

14. The article of claim 12, wherein the electrically insulating layer has the same chemical composition and form as the first electrically insulating substrate and/or the second electrically insulating substrate.

15. The article of claim 12, further comprising a gel electrolyte that contacts the first coated substrate and the second coated substrate.

16. The article of claim 12, where the first electrically insulating substrate and the second electrically insulating substrate comprise a polymer and/or a ceramic.

17. The article of claim 16, where the polymer is at least one selected from the group comprising a polyacetal, a polyolefin, a polyacrylic, a polycarbonate, a polystyrene, a polyester, a polyamide, a polyamideimide, a polyarylate, a polyarylsulfone, a polyethersulfone, a polyphenylene sulfide, a polyvinyl chloride, a polysulfone, a polyimide, a polyetherimide, a polytetrafluoroethylene, a polyetherketone, a polyether etherketone, a polyether ketone ketone, a polybenzoxazole, a polyphthalide, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polyethylene terephthalate, polybutylene terephthalate, polyurethane, polytetrafluoroethylene, perfluoroelastomers, fluorinated ethylene propylene, perfluoroalkoxyethylene, polychlorotrifluoroethylene, polyvinylidene fluoride, polysiloxanes, or a combination thereof.

18. The article of claim 16, where the ceramic is at least one selected from the group comprising metal oxides, metal carbides, metal nitrides, metal borides, metal silicides, metal oxycarbides, metal oxynitrides, metal boronitrides, metal carbonitrides, metal borocarbides, or a combination thereof.

19. A method comprising:
charging a vapor comprising 3,4-ethylenedioxythiophene into a reactor; where the reactor comprises an electrically insulating substrate;
charging a vapor comprising an iron salt into the reactor;
polymerizing the 3,4-ethylenedioxythiophene with the iron salt to form a p-doped poly(3,4-ethylenedioxythiophene); disposing a p-doped poly(3,4-ethylenedioxythiophene) layer directly on the electrically insulating substrate; and
disposing an electrically insulating layer that comprises a gel directly on the p-doped poly(3,4-ethylenedioxythiophene) layer.

* * * * *